(12) United States Patent
Westhaeuser et al.

(10) Patent No.: US 11,813,921 B2
(45) Date of Patent: Nov. 14, 2023

(54) HEAT PUMP FOR A MOTOR VEHICLE AND A METHOD OF OPERATING THE HEAT PUMP

(71) Applicant: Volkswagen Aktiengesellschaft, Wolfsburg (DE)

(72) Inventors: Jochen Westhaeuser, Wolfsburg (DE); Sven Twenhoevel, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 136 days.

(21) Appl. No.: 17/202,086

(22) Filed: Mar. 15, 2021

(65) Prior Publication Data

US 2021/0283982 A1  Sep. 16, 2021

(30) Foreign Application Priority Data

Mar. 13, 2020 (DE) .................. 10 2020 107 006.3

(51) Int. Cl.
*B60H 1/00* (2006.01)
*F25B 47/02* (2006.01)
*F25B 30/02* (2006.01)

(52) U.S. Cl.
CPC ..... *B60H 1/00899* (2013.01); *B60H 1/00585* (2013.01); *B60H 1/00735* (2013.01);
(Continued)

(58) Field of Classification Search
CPC ............ B60H 1/00899; B60H 1/00585; B60H 1/00735; B60H 2001/00961;
(Continued)

(56) References Cited

U.S. PATENT DOCUMENTS 4,326,868 A * 4/1982 Ozu ...................... F25B 47/022
62/196.3
6,138,457 A * 10/2000 Lackstrom .............. F25B 27/00
60/671
(Continued)

FOREIGN PATENT DOCUMENTS

DE    3224045 A1    12/1983
DE    10301006 A1 *  7/2003
(Continued)

*Primary Examiner* — Ljiljana V. Ciric
(74) *Attorney, Agent, or Firm* — Muncy, Geissler, Olds & Lowe, P.C.

(57) ABSTRACT

A method for operating a heat pump of a motor vehicle that includes a compressor, an expander, an ambient heat exchanger and a heating heat exchanger. In the method, a defrost mode for defrosting the ambient heat exchanger is initiated. In the defrost mode, a refrigerant is compressed to a high pressure by the compressor to transfer thermal energy to the ambient heat exchanger, the refrigerant is expanded to a low pressure by the expander, and the refrigerant absorbs thermal energy in the heating heat exchanger. Further, a defrosting process of the ambient heat exchanger triggered by the defrost mode is monitored. The monitoring of the defrosting process includes monitoring the pressure difference between the high pressure and the low pressure and/or monitoring the pressure gradient of the pressure difference between the high pressure and the low pressure and/or monitoring the high pressure.

4 Claims, 8 Drawing Sheets

(52) U.S. Cl.
CPC .............. *F25B 30/02* (2013.01); *F25B 47/02* (2013.01); *B60H 2001/00961* (2019.05)

(58) Field of Classification Search
CPC ..... B60H 1/00392; B60H 1/004; F25B 30/02; F25B 47/02; F25B 30/06; F25B 39/00; F25B 9/06; F25B 11/02
See application file for complete search history.

(56) References Cited

U.S. PATENT DOCUMENTS

| | | | | |
|---|---|---|---|---|
| 7,490,483 | B2 * | 2/2009 | Boiarski | F25B 40/00 |
| | | | | 62/515 |
| 8,091,381 | B2 * | 1/2012 | Boiarski | F25B 39/00 |
| | | | | 62/513 |
| 11,415,346 | B2 * | 8/2022 | Peppard | F28D 1/05391 |
| 2013/0192280 | A1 * | 8/2013 | Kim | F25D 21/08 |
| | | | | 62/155 |

FOREIGN PATENT DOCUMENTS

| | | | |
|---|---|---|---|
| DE | 102006013587 A1 | | 9/2007 |
| DE | 102011051285 A1 | | 12/2012 |
| DE | 102016013053 A1 | | 5/2018 |
| DE | 102019006535 A1 | | 3/2020 |
| DE | 112016006864 B4 | * | 2/2023 |
| EP | 2790938 B1 | * | 12/2015 |
| EP | 2516942 B1 | * | 10/2020 |
| EP | 2683993 B1 | * | 12/2021 |
| FR | 2973482 A1 | * | 10/2012 |
| GB | 2037965 A | * | 7/1980 |
| JP | H07195935 A | | 8/1995 |

* cited by examiner

HEAT PUMP FOR A MOTOR VEHICLE AND A METHOD OF OPERATING THE HEAT PUMP

This nonprovisional application claims priority under 35 U.S.C. § 119(a) to German Patent Application No. 10 2020 107 006.3, which was filed in Germany on Mar. 13, 2020 and which is herein incorporated by reference.

BACKGROUND OF THE INVENTION

Field of the Invention

The present invention relates to a method for operating a heat pump of a vehicle and to a heat pump.

Description of the Background Art

It is generally known from the state of the art that heat pumps are used to heat the interior of a vehicle, especially in electromobility. The heat required for heating is taken from the outside air, wherein the ambient heat exchanger of the heat pump must be cooled to below ambient temperature. However, if the outside air falls below its dew point, frost or ice forms on the surface of the heat exchanger. This prevents the air from flowing through the heat exchanger and efficient operation of the heat pump is no longer ensured. Defrost cycles are necessary to allow air to flow through the heat exchanger again. The aim of these defrost cycles is to melt the ice and allow air to flow through the heat exchanger again. For example, U.S. Pat. No. 2,303,857 A1 describes how a corresponding heat exchanger is defrosted. However, it does not disclose how the end of the defrosting process is determined.

SUMMARY OF THE INVENTION

It is therefore an object of the present invention to provide a method for operating a heat pump as well as improve a heat pump in such a way that the end of a defrosting process of the ambient heat exchanger can be determined in order to be able to switch back to the heating operation of the heat pump as soon as possible and thus increase the efficiency of the heat pump.

The aforementioned object is achieved by a method for operating a heat pump of a motor vehicle, in particular a hybrid or electric vehicle. The heat pump comprises a compressor, an expander, an ambient heat exchanger and a heating heat exchanger.

The method comprises initiating a defrost mode to defrost the ambient heat exchanger in order to start a defrosting process of the ambient heat exchanger. In particular, the heat pump is deliberately switched from a heating mode to a defrost mode to defrost the ambient heat exchanger. Thereby, the defrost mode should preferably end when the defrosting process of the ambient heat exchanger is finished to ensure the efficiency of the heat pump. Further preferably, icing of the ambient heat exchanger was previously detected.

The defrost mode comprises compressing a refrigerant to a high pressure by means of the compressor, transferring thermal energy from the refrigerant to an ambient heat exchanger, in particular one that is frosted or iced over, expanding the refrigerant to a low pressure by means of the expander and absorbing thermal energy. For this purpose, the heat can be absorbed from the vehicle interior or from another heat source. For example, another heat source can be the waste heat derived from traction components or the coolant circuit of the vehicle. The heat is transferred to the refrigerant by means of the heating heat exchanger. The expander is primarily a throttle.

During compression, the refrigerant preferably heats up. It is then fed to the ambient heat exchanger, where it supplies heat to the ambient heat exchanger. Thus, the latter is de-iced or defrosted. In this sense, thermal energy is transferred to the ambient heat exchanger by means of the refrigerant. The refrigerant cools down and liquefies. In other words, the ambient heat exchanger acts as a condenser in defrost mode. Subsequently, the refrigerant is brought to a low pressure by means of an expander, wherein it is then fed to the heating heat exchanger so that the refrigerant absorbs thermal energy. The refrigerant is then returned to the compressor.

Due to the above-mentioned "path" of the refrigerant, a refrigerant circuit is formed. In defrost mode, the refrigerant circuit is reversed as compared to heating mode. Whereas in heating mode the ambient heat exchanger serves as an evaporator, in defrost mode it serves as a condenser. The same applies to the heating heat exchanger, which acts as an evaporator in defrost mode and as a condenser in heating mode.

The method is characterized by monitoring the defrosting process of the ambient heat exchanger. The defrosting process is triggered by the initiation of the defrost mode. Monitoring the defrosting process includes monitoring a pressure difference between the high pressure and the low pressure and/or monitoring a pressure gradient of the pressure difference between the high pressure and the low pressure and/or monitoring the high pressure. Due to the decreasing ice and/or frost mass, the energy content of the environment of the vehicle, in particular the environment of the ambient heat exchanger, as a heat sink decreases; the temperature of the refrigerant and the high pressure thus increase. The defrosting process can thus be monitored on the basis of the route of the high pressure. Furthermore, there is a higher pressure difference between high and low pressure, since the high pressure increases and the low pressure remains constant with constant other boundary conditions, for example the mass flow, the compressor speed and the opening of the expander. Furthermore, the pressure gradient increases as the ice and/or frost mass decreases. In this context, monitoring the pressure difference and/or the pressure gradient is particularly advantageous, since these also include information about the low pressure and are not solely dependent on the high pressure, which is also influenced by other factors.

For monitoring purposes, the method may comprise the regular determination of the high pressure and preferably the low pressure. For this purpose, a sensor arranged in the refrigerant circuit may be used in each case. In particular, the method does not comprise using a sensor, for example a thermocouple, on the surface of the ambient heat exchanger.

The present invention is suitable for operating the heat pump as efficiently and cost-effectively as possible, since the end of the defrosting process can be determined precisely, as promptly as possible and cost-effectively, in order to switch back to the heating operation of the heat pump as early as possible. Thus, a needs-based defrosting process is achieved.

Preferably, the method comprises detecting an appearance of an end-of-defrosting indicator, namely an indicator appears when the pressure difference and/or the pressure gradient and/or the high pressure exceed a respective predefined threshold. In particular, the time when the indicator appears is determined. In this context, the term "end of defrosting" is to be understood in relation to the defrosting process. The end of defrosting defines the completion of the defrosting process, that is, the substantially complete de-icing of the ambient heat exchanger. It is not the end of the defrost mode, which can be deliberately initiated, but the end of the defrosting process of the ice and/or frost mass. Exceeding a previously defined threshold thus defines the appearance of an indicator.

Advantageously, the previously defined threshold for the pressure difference is 120%, further preferably 135%, most preferably 150%, of the pressure difference at the initiation of the defrost mode. With respect to the pressure gradient, the previously defined threshold is 120%, more preferably 135%, most preferably 150%, of the pressure gradient at the initiation of the defrost mode. Advantageously, the previously defined threshold for the high pressure is 120%, further preferably 135%, most preferably 150%, of the high pressure at the initiation of the defrost mode.

In particular, the method comprises detecting the end of defrosting, wherein the end of defrosting is detected as soon as at least one indicator, preferably several indicators, for the end of defrosting is detected. In particular, the time of the end of defrosting is determined. In other words, the time of the appearance of an indicator corresponds to the time of the end of defrosting. Further, the end of defrosting may be determined after a previously defined delay time has elapsed after the appearance of an indicator has been determined. Thus, a delay in the defrosting process can be factored in to ensure that the defrosting process is definitely completed. As a side benefit, it is also possible to ensure a longer time for a water discharge of the heat transfer. The delay time is in particular two seconds, more preferably five seconds, most preferably ten seconds.

In particular, the method includes terminating the defrost mode as soon as the end of defrosting is detected or the duration of the defrost mode exceeds a previously defined length. Instead, the heat pump is switched to heating mode in particular. The previously defined length is in particular at most one minute, further preferably at most 1.5 minutes, most preferably at most two minutes.

In heating mode, the method includes compressing the refrigerant to a high pressure by means of a compressor, as compared to the defrost mode, wherein the refrigerant is subsequently fed to the heating heat exchanger. The method preferably comprises transferring thermal energy from the refrigerant to a mass air flow for the vehicle interior by means of the heating heat exchanger. In the process, the refrigerant cools and liquefies. The energy released during cooling and liquefaction of the refrigerant is transferred to the mass air flow by means of the heating heat exchanger. The refrigerant is then brought to a low pressure by means of an expander, at which point it is directed to an ambient heat exchanger so that the refrigerant absorbs thermal energy from the environment of the motor vehicle. The expander and the compressor can thus work in both directions, subject to the defrost or heating mode.

In another aspect, the invention relates to a heat pump of a motor vehicle, in particular a hybrid or electric vehicle, wherein the heat pump comprises at least a compressor, an expander, an ambient heat exchanger and a heating heat exchanger. For the defrost mode of the heat pump, the compressor is configured to compress a refrigerant to a high pressure and the expander is configured to expand the refrigerant to a low pressure. The heating heat exchanger mainly serves to absorb thermal energy. The heat pump includes a monitoring unit for monitoring the defrosting process of the ambient heat exchanger triggered by the defrost mode of the heat pump. The monitoring unit is designed to monitor a pressure difference between the high pressure and the low pressure and/or to monitor a pressure gradient of the pressure difference between the high pressure and the low pressure and/or to monitor the high pressure. In particular, the heat pump has corresponding sensors in the refrigerant circuit that determine the high pressure and the low pressure at regular intervals. Furthermore, the monitoring unit can additionally be designed as a control unit, for example to initiate and/or terminate the defrost mode and/or to initiate and/or terminate the heating mode.

Further preferably, the heat pump is designed to perform a method described above.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
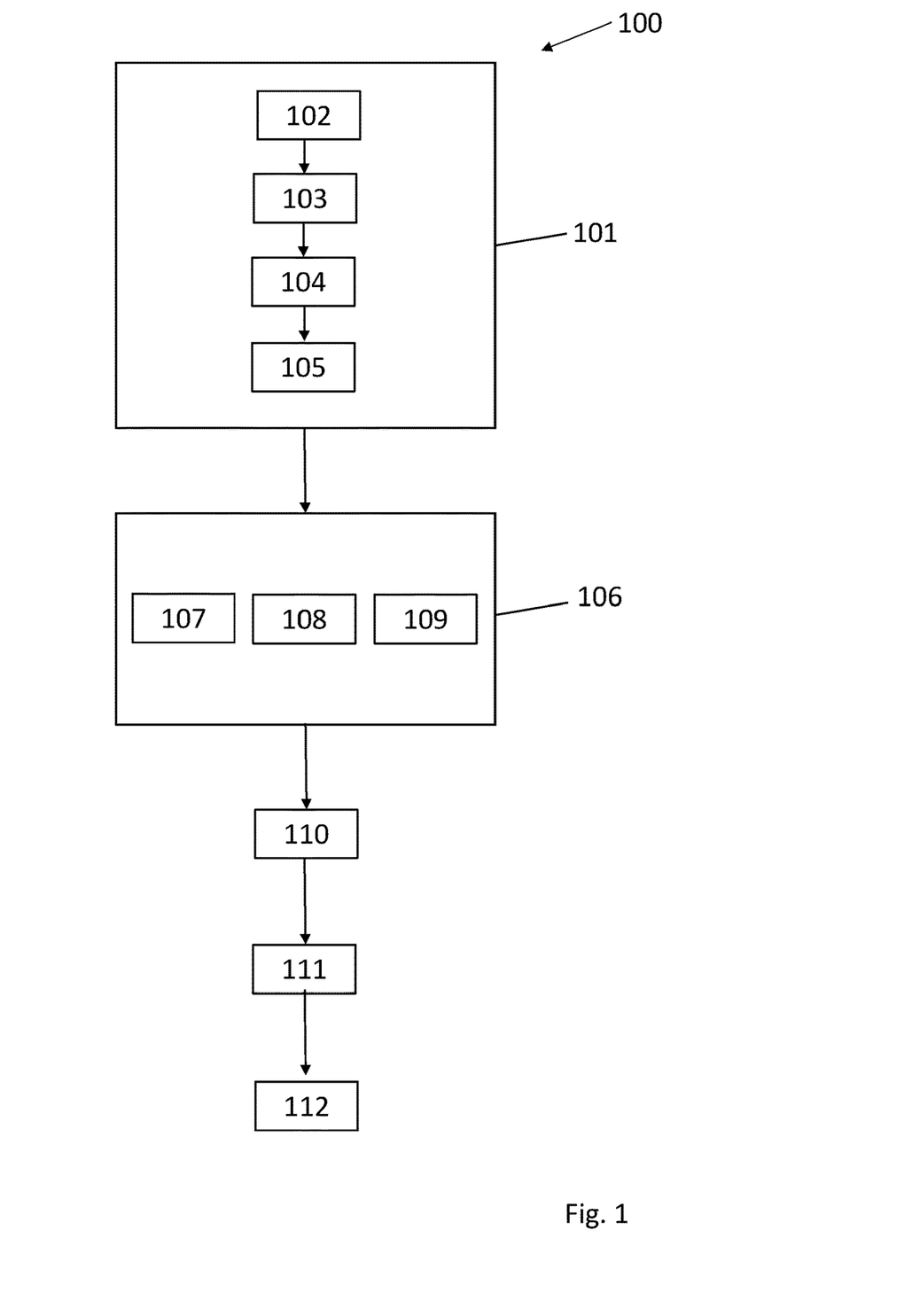
FIG. 1 is a process flow chart of a process flow of a method according to the invention, with FIGS. 3-8 depicting the process flow chart of FIG. 1 taking into account alternative pressure aspects that are monitored during the monitoring step 106.

The method 100 according to the invention comprises initiating 101 a defrost mode of the ambient heat exchanger 14 of the heat pump 10.

In defrost mode, the method includes compressing 102 a refrigerant to a high pressure by means of a compressor 11, transferring 103 thermal energy from the refrigerant to the ambient heat exchanger 14, thereby heating the ambient heat exchanger 14 and defrosting it accordingly. The method 100 further comprises expanding 104 the refrigerant to a low pressure by means of an expander 13, and receiving 105 thermal energy from a mass air flow of a vehicle interior onto the refrigerant by means of the heating heat exchanger.

In defrost mode, the refrigerant circuit is reversed as compared to the heating mode. While in heating mode, the ambient heat exchanger serves as an evaporator; in defrost mode it serves as a condenser. The same applies to the heating heat exchanger, which acts as an evaporator in defrost mode and as a condenser in heating mode.

Further, the method 100 according to the invention comprises monitoring 106 a defrosting process of the ambient heat exchanger 14 initiated by the defrost mode. A pressure difference between the high pressure and the low pressure is monitored 107 and/or a pressure gradient of the pressure difference between the high pressure and the low pressure is monitored 108 and/or the high pressure is monitored 109.

Further, the method 100 may comprise detecting 110 an appearance of an end-of-defrosting indicator, and in particular when the pressure difference and/or the pressure gradient and/or the high pressure exceed a respective predefined threshold. Furthermore, the end of defrosting may be detected 111 as soon as at least one indicator for the end of defrosting has been detected, or after expiry of a previously defined delay upon detection of the appearance of an indicator.

In addition, the method 100 preferably comprises terminating 112 the defrost mode once the end of defrosting has been determined 111 and/or the duration of the defrost mode exceeds a previously defined length.

Figure 2:
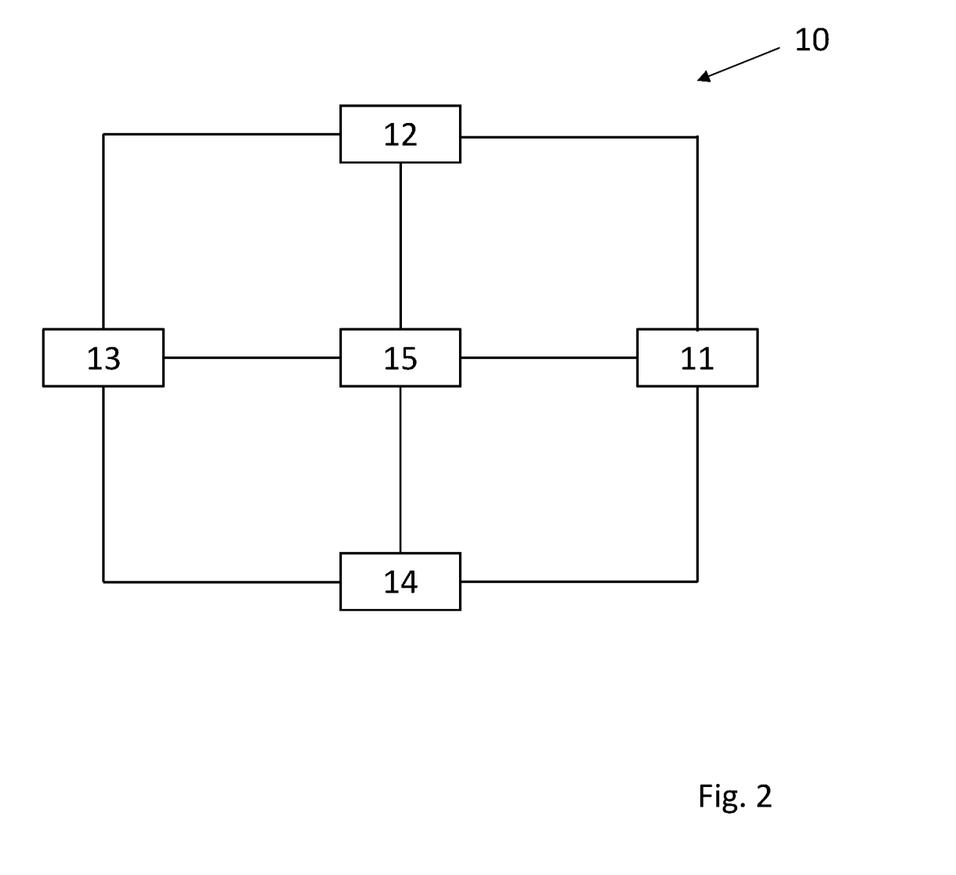
FIG. 2 is a schematic representation of a heat pump according to the invention.
Figure 3:
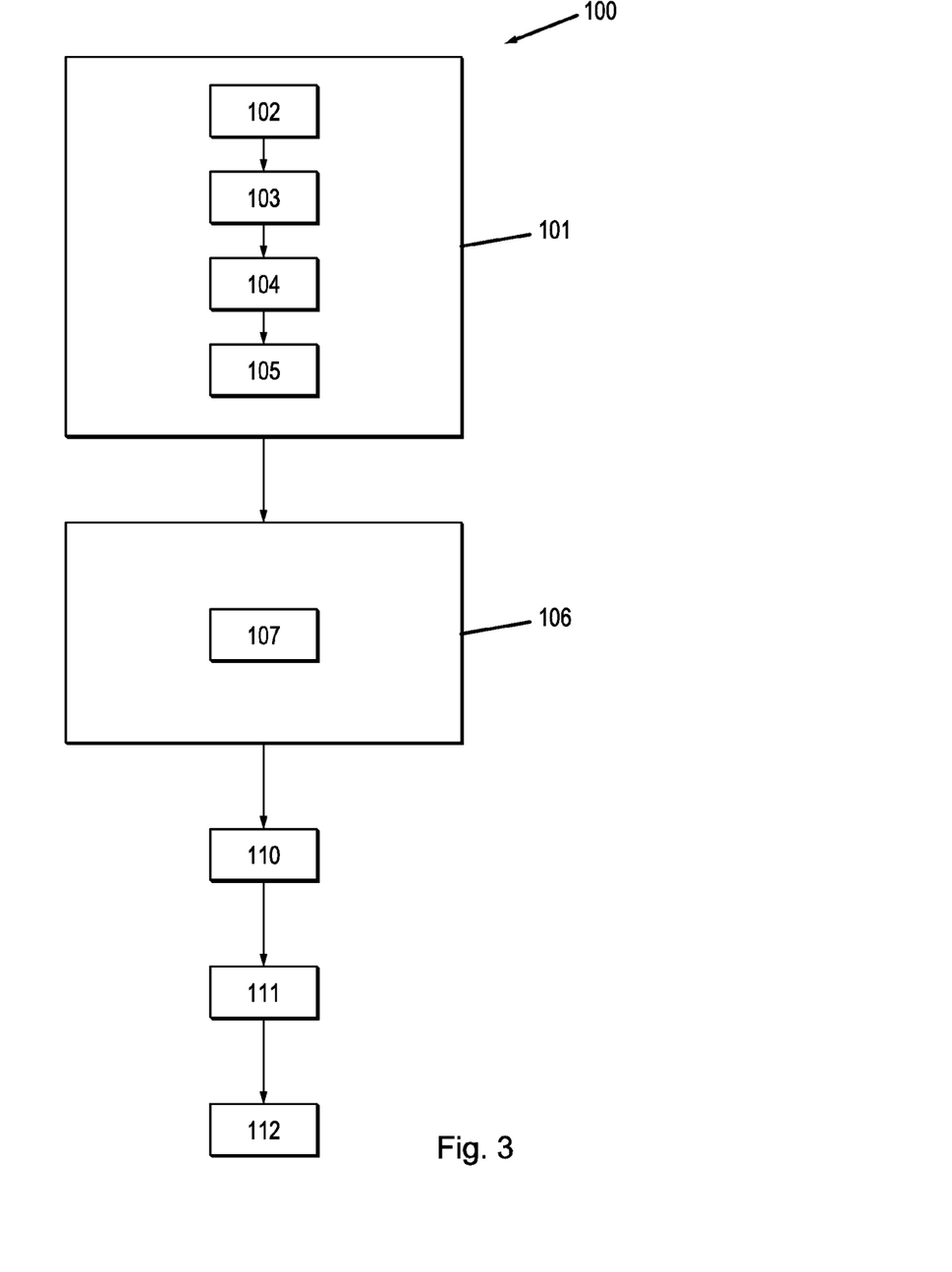
Figure 4:
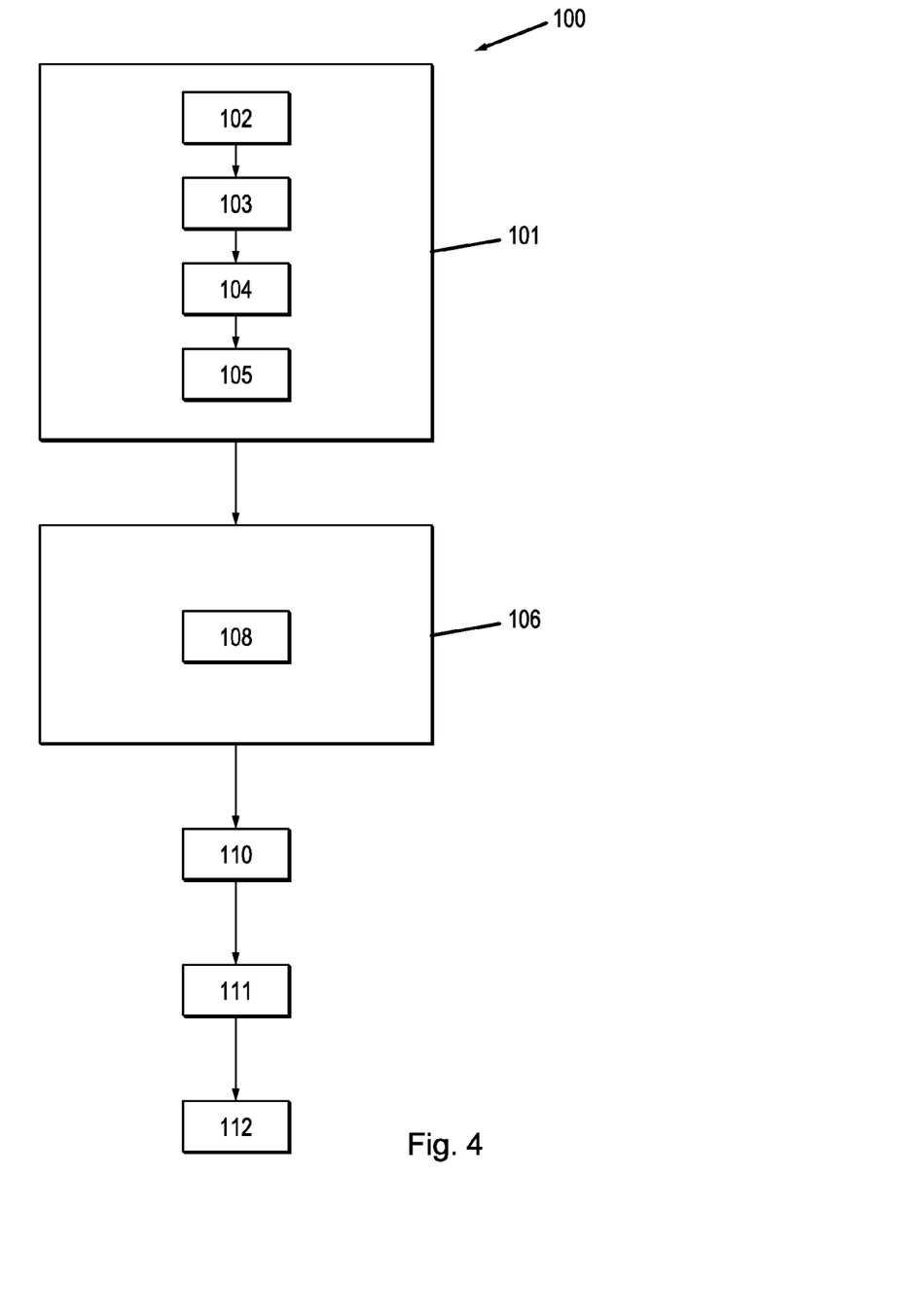
Figure 5:
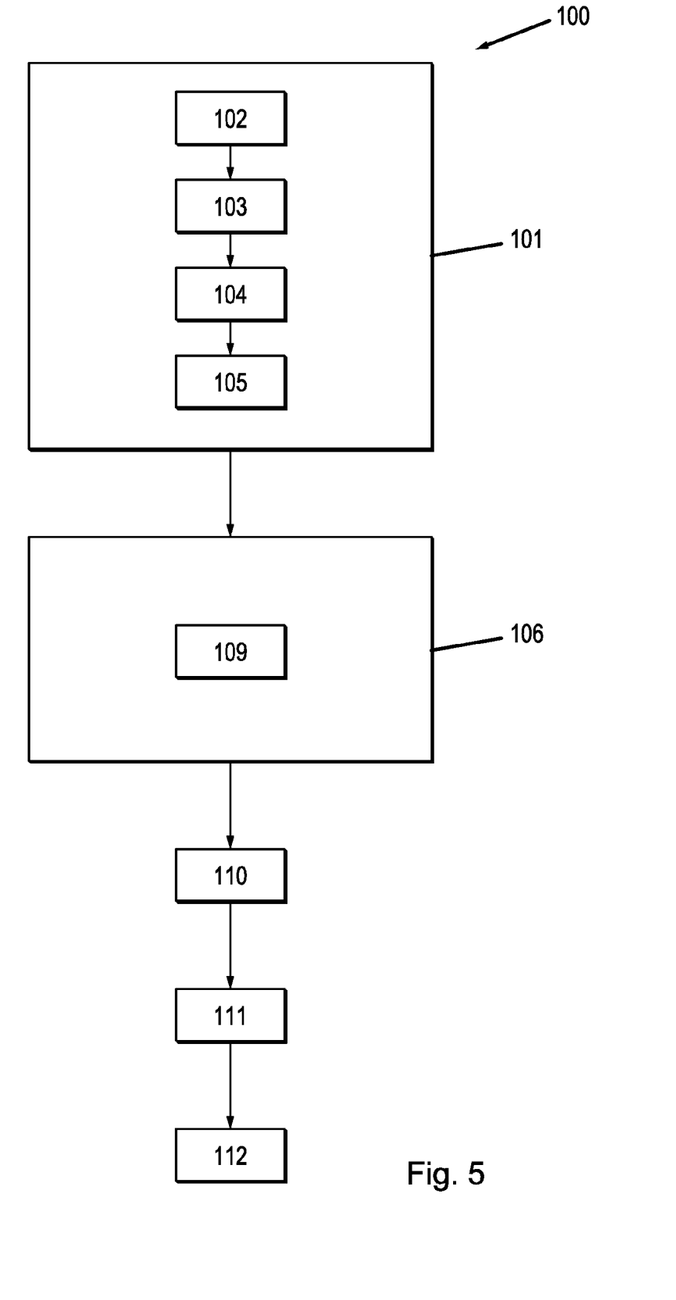
Figure 6:
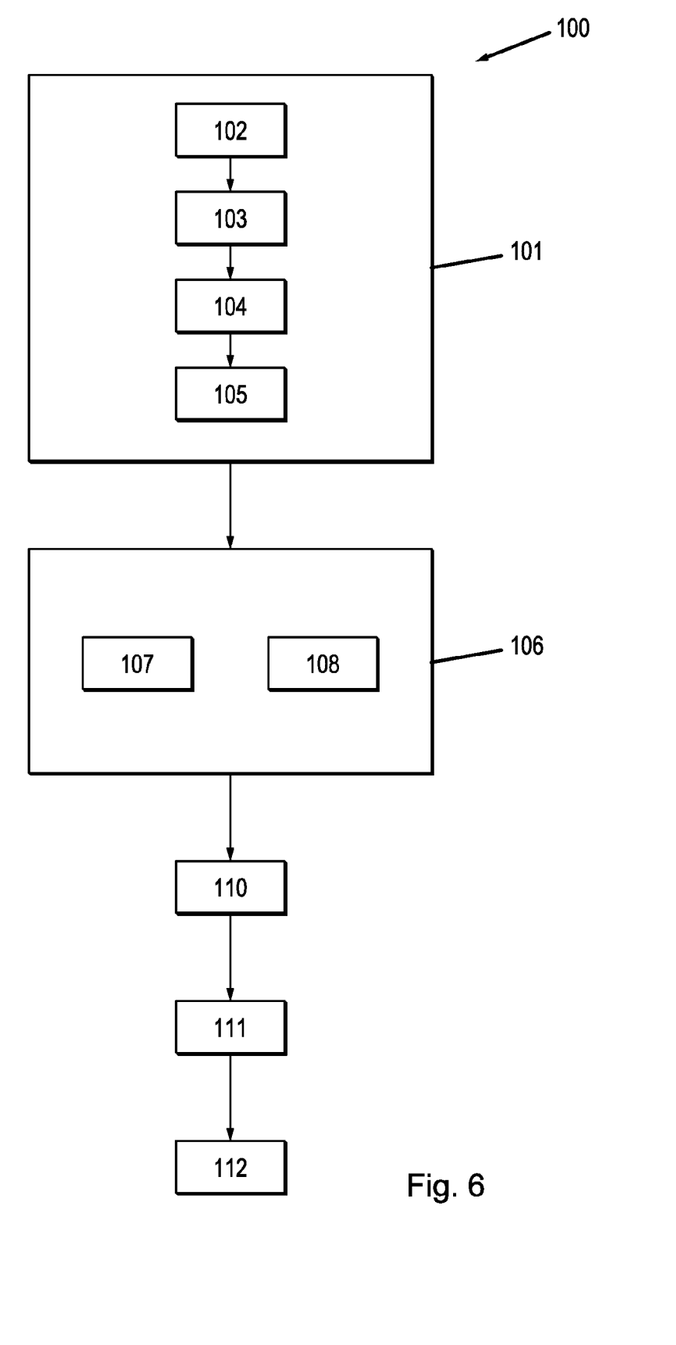
Figure 7:
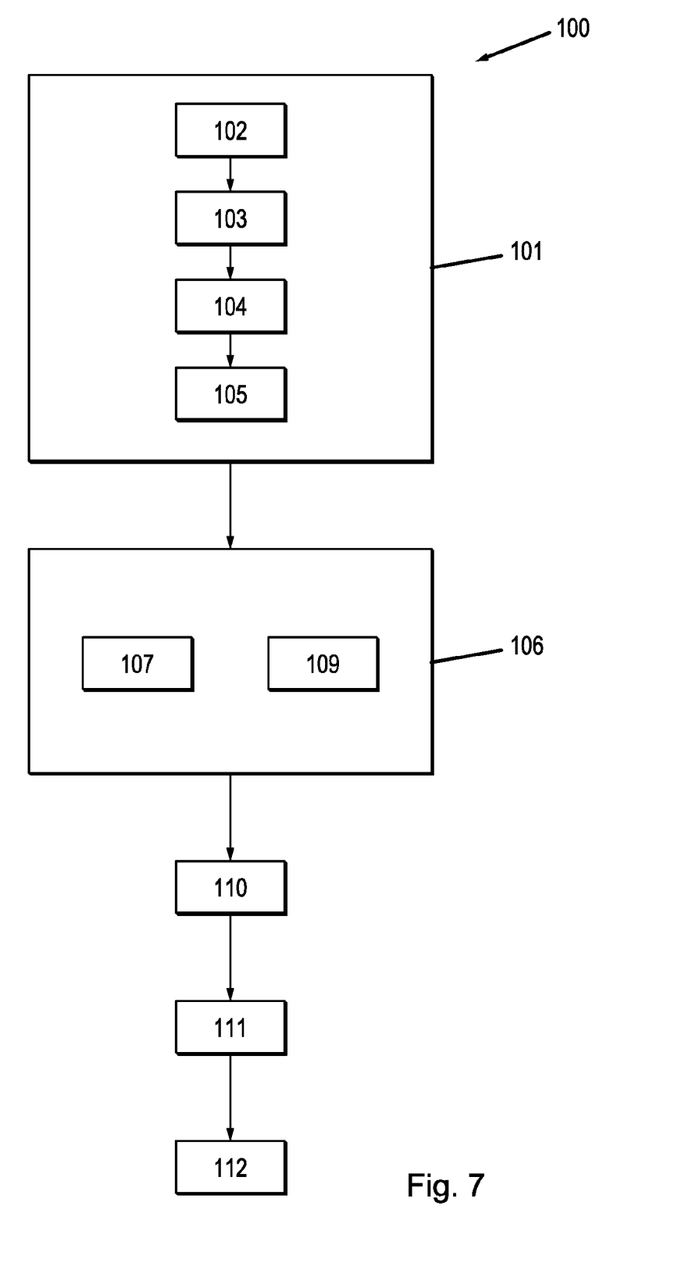
Figure 8:
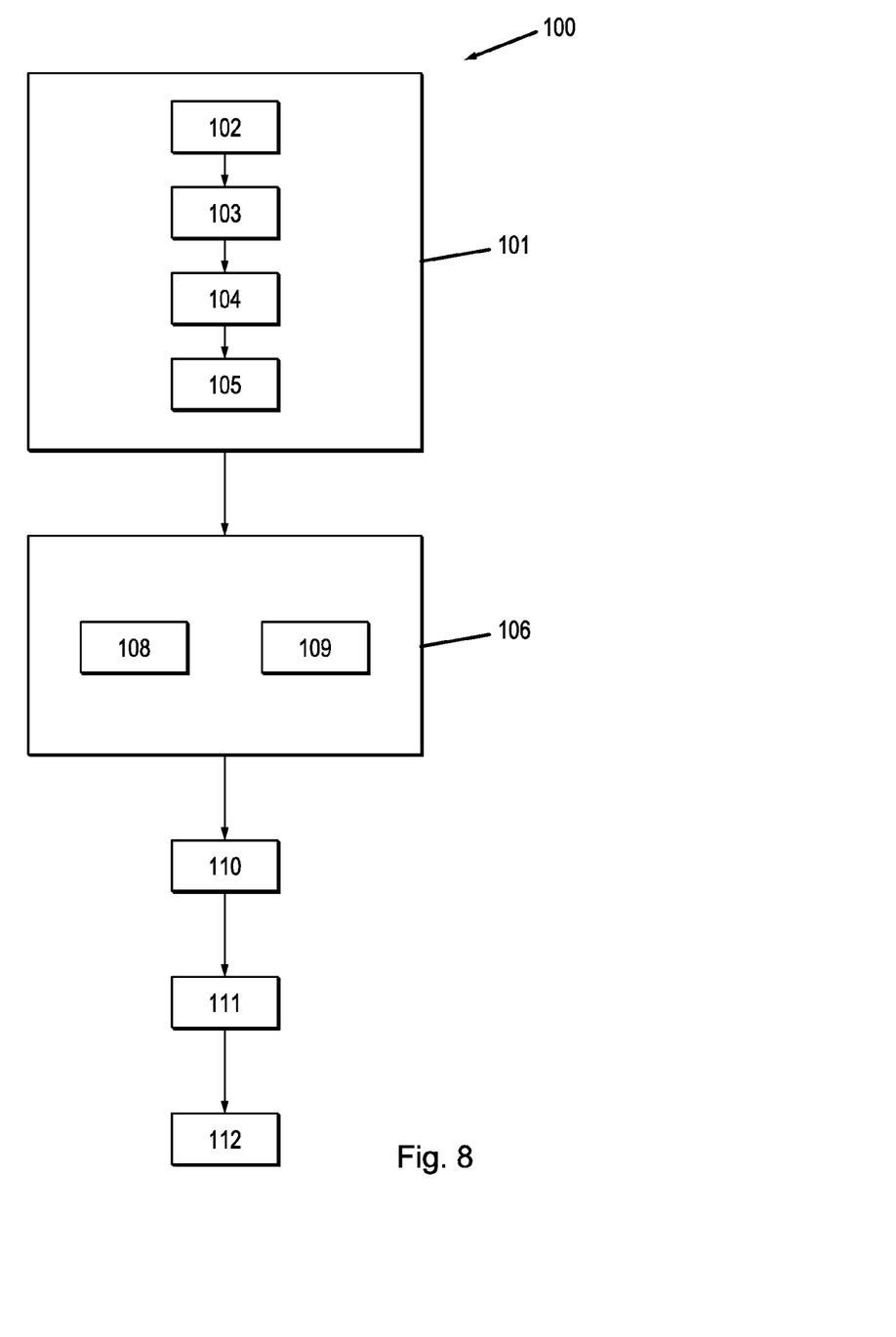

FIG. 2 shows a heat pump 10 of a motor vehicle according to the invention, comprising a compressor 11 for compressing a refrigerant to a high pressure, an ambient heat exchanger 14, an expander 13 for expanding the refrigerant to a low pressure, and a heating heat exchanger 12 for absorbing thermal energy. Further, the heat pump 10 comprises a monitoring unit 15, which may comprise at least one respective sensor to detect the high pressure and the low pressure and to monitor the high pressure and/or the pressure difference and/or the pressure gradient. Moreover, the monitoring unit may further be configured as a control unit to, for example, initiate and/or terminate the defrost mode and/or initiate and/or terminate the heating mode.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a heat pump of a motor vehicle, the heat pump comprises a compressor, an expander, an ambient heat exchanger, and a heating heat exchanger, the method comprising:
   initiating a defrost mode for defrosting the ambient heat exchanger, wherein the defrost mode comprises:
      compressing a refrigerant to a high pressure via the compressor;
      transferring thermal energy from the refrigerant to the ambient heat exchanger;
      expanding the refrigerant to a low pressure via the expander; and
      the refrigerant absorbing thermal energy in the heating heat exchanger;
   monitoring a defrosting process of the ambient heat exchanger triggered by the defrost mode, the monitoring of the defrosting process comprises monitoring of the pressure difference between the high pressure and the low pressure and/or monitoring of the pressure gradient of the pressure difference between the high pressure and the low pressure and/or monitoring of the high pressure, and
   detecting an appearance of an indicator that indicates the end of defrosting of the defrosting process, the indicator being detected when the pressure difference exceeds a predefined threshold and/or the pressure gradient exceeds a predefined threshold and/or the high pressure exceeds a predefined threshold,
   wherein, the predefined threshold for the pressure difference is 120% of a pressure difference between the high pressure and the low pressure that is detected at the initiation of the defrost mode and/or the predefined threshold for the pressure gradient is 120% of a pressure gradient of the pressure difference between the high pressure and the low pressure that is detected at the initiation of the defrost mode and/or the predefined threshold for the high pressure is 120% of a high pressure that is detected at the initiation of the defrost mode.

2. The method according to claim 1, wherein the method comprises detecting the end of defrosting, and wherein the end of defrosting is detected as soon as at least one end-of-defrosting indicator is detected.

3. The method according to claim 1, wherein the method comprises detecting the end of defrosting, and wherein the end of defrosting is detected when a previously defined delay time has elapsed upon detecting the appearance of the indicator.

4. The method according to claim 1, wherein the method further comprises terminating the defrost mode as soon as the end of defrosting is detected or the duration of the defrost mode exceeds a predefined length.

* * * * *